(12) United States Patent
Nian et al.

(10) Patent No.: US 12,339,482 B2
(45) Date of Patent: Jun. 24, 2025

(54) DISPLAY DEVICE AND OPERATING METHOD THEREOF

(71) Applicant: AUO Corporation, Hsin-Chu (TW)

(72) Inventors: Han-Sheng Nian, Hsin-Chu (TW);
Ming-Jui Wang, Hsin-Chu (TW);
Chih-Chiang Chen, Hsin-Chu (TW);
Chia-Hsin Chung, Hsin-Chu (TW);
Yu-Cheng Shih, Hsin-Chu (TW);
Wei-Syun Wang, Hsin-Chu (TW);
Cheng-Chan Wang, Hsin-Chu (TW);
Hsin-Hung Li, Hsin-Chu (TW);
Sheng-Ming Huang, Hsin-Chu (TW)

(73) Assignee: AUO CORPORATION, Hsin-Chu (TW)

(*) Notice: Subject to any disclaimer, the term of this patent is extended or adjusted under 35 U.S.C. 154(b) by 353 days.

(21) Appl. No.: 18/071,976

(22) Filed: Nov. 30, 2022

(65) Prior Publication Data
US 2024/0019620 A1    Jan. 18, 2024

(30) Foreign Application Priority Data
Jul. 15, 2022  (CN) .......................... 202210835847.6

(51) Int. Cl.
*F21V 8/00*    (2006.01)

(52) U.S. Cl.
CPC ......... *G02B 6/0016* (2013.01); *G02B 6/0036* (2013.01); *G02B 6/0068* (2013.01)

(58) Field of Classification Search
CPC .. G02B 6/0012; G02B 6/0036; G02B 27/206; G02B 27/1066
See application file for complete search history.

(56) References Cited

U.S. PATENT DOCUMENTS

| 8,681,184 | B2 | 3/2014 | Seesselberg |
| 9,791,703 | B1* | 10/2017 | Vallius .................. G02B 6/005 |
| 10,690,916 | B2* | 6/2020 | Popovich ............. G02B 6/0035 |
| 2013/0314789 | A1* | 11/2013 | Saarikko ............. G02B 27/283 |
| | | | 359/558 |
| 2020/0142109 | A1 | 5/2020 | Olkkonen et al. |

(Continued)

FOREIGN PATENT DOCUMENTS

| CN | 110582716 A | 12/2019 |
| CN | 112817151 A | 5/2021 |
| CN | 214474235 U | 10/2021 |

*Primary Examiner* — Tina Wong
(74) *Attorney, Agent, or Firm* — WPAT, PC

(57) ABSTRACT

A display device includes a first image generating unit and a first waveguide glass. The first image generating unit is configured to emit first light. The first waveguide glass faces toward the first image generating unit. The first waveguide glass includes a first microstructure, two second microstructures and a third microstructure. The first microstructure is located between two ends at the same side of the two second microstructures. The third microstructure is located between the two second microstructures. The third microstructure has a first grating and a second grating. An extending direction of the first grating is different from an extending direction of the second grating. The second microstructure is configured to receive the first light of the first image generating unit transmitted through the first microstructure and transmit the first light to the third microstructure.

10 Claims, 4 Drawing Sheets

(56) References Cited

U.S. PATENT DOCUMENTS

| | | |
|---|---|---|
| 2020/0278543 A1 | 9/2020 | Schultz |
| 2021/0055552 A1 | 2/2021 | Chi |
| 2021/0109273 A1* | 4/2021 | Jiang .................... G02B 6/0038 |
| 2022/0026619 A1* | 1/2022 | Park .................... G02B 27/4205 |
| 2022/0214494 A1* | 7/2022 | Levola ................. G02B 6/0035 |

* cited by examiner

DISPLAY DEVICE AND OPERATING METHOD THEREOF

RELATED APPLICATION

This application claims priority to China Application Serial Number 202210835847.6, filed Jul. 15, 2022, which is herein incorporated by reference in its entirety.

BACKGROUND

Field of Invention

The present disclosure relates to a display device and an operating method of the display device.

Description of Related Art

In general, a display device applied to augmented reality (AR) glasses usually has an image generator and multiple sheets of waveguide glasses stacked on each other. An image provided by the image generator may combine with a real scene by the waveguide glasses, which may provide assistance information to a user. However, multiple sheets of the stacked waveguide glasses may improve a viewing angle of the display device, but the stacked waveguide glasses may increase an overall thickness of the display device. In addition, the stacked waveguide glasses also increase a manufacturing cost and an overall weight of the display device.

SUMMARY

An aspect of the present disclosure is related to a display device.

According to one embodiment of the present disclosure, a display device includes a first image generating unit and a first waveguide glass. The first image generating unit is configured to emit first light. The first waveguide glass faces toward the first image generating unit. The first waveguide glass includes a first microstructure, two second microstructures and a third microstructure. The first microstructure is located between two ends at the same side of the two second microstructures. The third microstructure is located between the two second microstructures. The third microstructure has a first grating and a second grating. An extending direction of the first grating is different from an extending direction of the second grating. The second microstructure is configured to receive the first light of the first image generating unit transmitted through the first microstructure and transmit the first light to the third microstructure.

In one embodiment of the present disclosure, the display device further includes a second image generating unit and a second waveguide glass. The second image generating unit is configured to emit a second light. A wavelength of the second light is different from a wavelength of the first light. The second waveguide glass faces toward the second image generating unit and is adjacent to the first waveguide glass.

In one embodiment of the present disclosure, a grating period of the second waveguide glass is different from a grating period of the first waveguide glass.

In one embodiment of the present disclosure, an extending direction of a grating of the first microstructure is different from an extending direction of a grating of one of the two second microstructures.

In one embodiment of the present disclosure, the first microstructure has a first portion and a second portion adjacent to the first portion.

In one embodiment of the present disclosure, an extending direction of a grating of the first portion of the first microstructure is different from an extending direction of a grating of the second portion of the first microstructure.

In one embodiment of the present disclosure, the first grating of the third microstructure at least partially overlaps the second grating of the third microstructure.

In one embodiment of the present disclosure, the extending direction of the first grating of the third microstructure is perpendicular to the extending direction of the second grating of the third microstructure.

In one embodiment of the present disclosure, the third microstructure has a third portion and a fourth portion adjacent to the third portion.

In one embodiment of the present disclosure, the first grating of the third microstructure is located in the third portion, and the second grating of the third microstructure is located in the fourth portion.

In one embodiment of the present disclosure, the first microstructure positionally corresponds to the third microstructure in a horizontal direction.

In one embodiment of the present disclosure, the two second microstructures are symmetrically disposed along a center line between the first microstructure and the third microstructure.

An aspect of the present disclosure is related to an operating method of a display device.

According to one embodiment of the present disclosure, an operating method of a display device includes: emitting a first light to a first microstructure of a first waveguide glass by a first image generating unit; transmitting the first light to two second microstructures of the first waveguide glass by the first microstructure of the first waveguide glass, wherein the first microstructure is located between two ends at the same side of the two second microstructures; and transmitting the first light to a third microstructure of the first waveguide glass by the two second microstructures of the first waveguide glass, wherein the third microstructure has a first grating and a second grating, and an extending direction of the first grating is different from an extending direction of the second grating.

In one embodiment of the present disclosure, the method further includes transmitting the first light to a first target area outside the first waveguide glass by the third microstructure of the first waveguide glass.

In one embodiment of the present disclosure, the method further includes: emitting a second light to a second waveguide glass by a second image generating unit, wherein a wavelength of the first light is different from a wavelength of the second light, and a grating period of the second waveguide glass is different from a grating period of the first waveguide glass; and transmitting the second light to a second target area outside the second waveguide glass by the second waveguide glass.

In the embodiments of the present disclosure, the first light emitted by the first image generating unit of the display device may be incident from both sides of the third microstructure by the two second microstructures of the first waveguide glass, therefore a brightness uniformity of the first light and an image quality of the display device are improved. In addition, the display device may improve the dispersion phenomenon of the first light emitted by the first image generating unit by a configuration of the first microstructure, the two second microstructures and the third microstructure of the first waveguide glass, so that a user may observe images with higher quality. An optical effect of the display device is improved.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
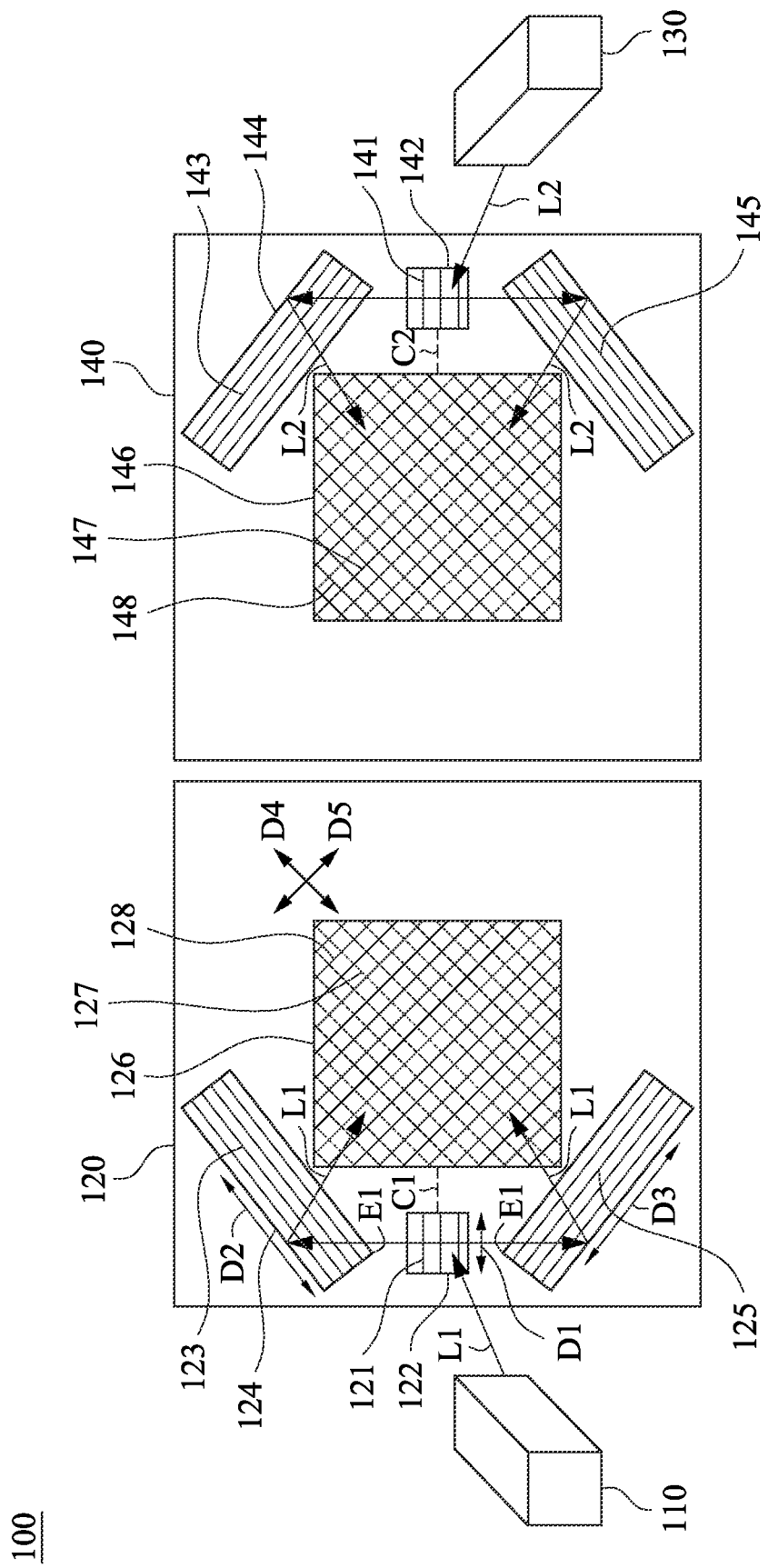
FIG. 1 illustrates a front view of using a display device according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a front view of using a display device 100 according to one embodiment of the present disclosure. The display device 100 includes a first image generating unit 110 and a first waveguide glass 120. The first image generating unit 110 is configured to emit a first light L1. For example, the first light L1 may be full-color. The first waveguide glass 120 faces toward the first image generating unit 110. The first waveguide glass 120 includes a first microstructure 122, two second microstructures 124 and a third microstructure 126. The first microstructure 122, the second microstructures 124 and the third microstructure 126 are located at the same surface of the first waveguide glass 120. The first microstructure 122 is located between two ends E1 at the same side of the two second microstructures 124. The second microstructure 124 may be a folded optical element to receive the first light L1 of the first image generating unit 110 transmitted through the first microstructure 122 and may transmit the first light L1 to the third microstructure 126.

In some embodiments, the first microstructure 122 may have a grating 121. One of the two second microstructures 124 (such as the upper second microstructure 124 in FIG. 1) may have a grating 123, and the other of the two second microstructures 124 (such as the lower second microstructure 124 in FIG. 1) may have a grating 125. An extending direction D1 of the grating 121 of the first microstructure 122 is different from an extending direction D2 of the grating 123 and an extending direction D3 of the grating 125 of the second microstructure 124. In addition, the extending direction D2 of the grating 123 is different from the extending direction D3 of the grating 125. That is, the extending direction D1 of the grating 121, the extending direction D2 of the grating 123, and the extending direction D3 of the grating 125 are all different. In addition, the conservation of optical momentum may be maintained among the first microstructure 122, the second microstructures 124 and the third microstructure 126, so the optical loss of the first light L1 caused by the transmission may be reduced.

In some embodiments, the two second microstructures 124 are symmetrically disposed along a center line C1 between the first microstructure 122 and the third microstructure 126. The first microstructure 122 positionally corresponds to the third microstructures 126 in a horizontal direction (such as the extension direction D1). The third microstructure 126 is located between the two second microstructures 124. The third microstructure 126 has a first grating 127 and a second grating 128. An extending direction D4 of the first grating 127 of the third microstructure 126 is different from an extending direction D5 of the second grating 128.

Particularly, the first light L1 emitted by the first image generating unit 110 of the display device 100 may be incident from both sides of the third microstructure 126 by the two second microstructures 124 of the first waveguide glass 120, therefore a brightness uniformity of the first light L1 and an image quality of the display device 100 are improved. In addition, the display device 100 may improve the dispersion phenomenon of the first light L1 emitted by the first image generating unit 110 by a configuration of the first microstructure 122, the two second microstructures 124 and the third microstructure 126 of the first waveguide glass 120, so that a user may observe images with higher quality. An optical effect of the display device 100 is improved.

In some embodiments, the display device 100 further includes a second image generating unit 130 and a second waveguide glass 140. The second image generating unit 130 is configured to emit a second light L2. For example, the second light L2 may be full-color. The wavelength of the second light L2 is different from the wavelength of the first light L1. The second waveguide glass 140 faces toward the second image generating unit 130 and is adjacent to the first waveguide glass 120. The second waveguide glass 140 includes a first microstructure 142, two second microstructures 144 and a third microstructure 146. The first microstructure 142, the second microstructures 144 and the third microstructure 146 are located at the same surface of the second waveguide glass 140. The first microstructure 142 may have a grating 141. One of the two second microstructures 144 (such as the upper second microstructure 144 in FIG. 1) may have a grating 143, and the other of the two second microstructures 144 (such as the lower second microstructure 144 in FIG. 1) may have a grating 145. The third microstructure 146 may have a first grating 147 and a second grating 148. The two second microstructures 144 are symmetrically disposed along a center line C2 between the first microstructure 142 and the third microstructure 146.

In addition, a grating period of the second waveguide glass 140 is different from a grating period of the first waveguide glass 120. For example, the wavelength of the first light L1 may correspond to the grating period of the first waveguide glass 120, and the grating period of the first waveguide glass 120 may be in a range from 330 nm to 460 nm. The wavelength of the second light L2 may correspond to the grating period of the second waveguide glass 140, and the grating period of the second waveguide glass 140 may be in a range from 250 nm to 380 nm. In some embodiments, the first grating 127 and of the third microstructure 126 of the first waveguide glass 120 at least partially overlaps the second grating 128. In detail, the first grating 127 and the second grating 128 are staggered to each other, and the first grating 127 and the second grating 128 are overlapped. The extending direction D4 of the first grating 127 of the third microstructure 126 of the first waveguide glass 120 may be perpendicular to the extending direction D5 of the second grating 128 of the third microstructure 126.

Figure 2:
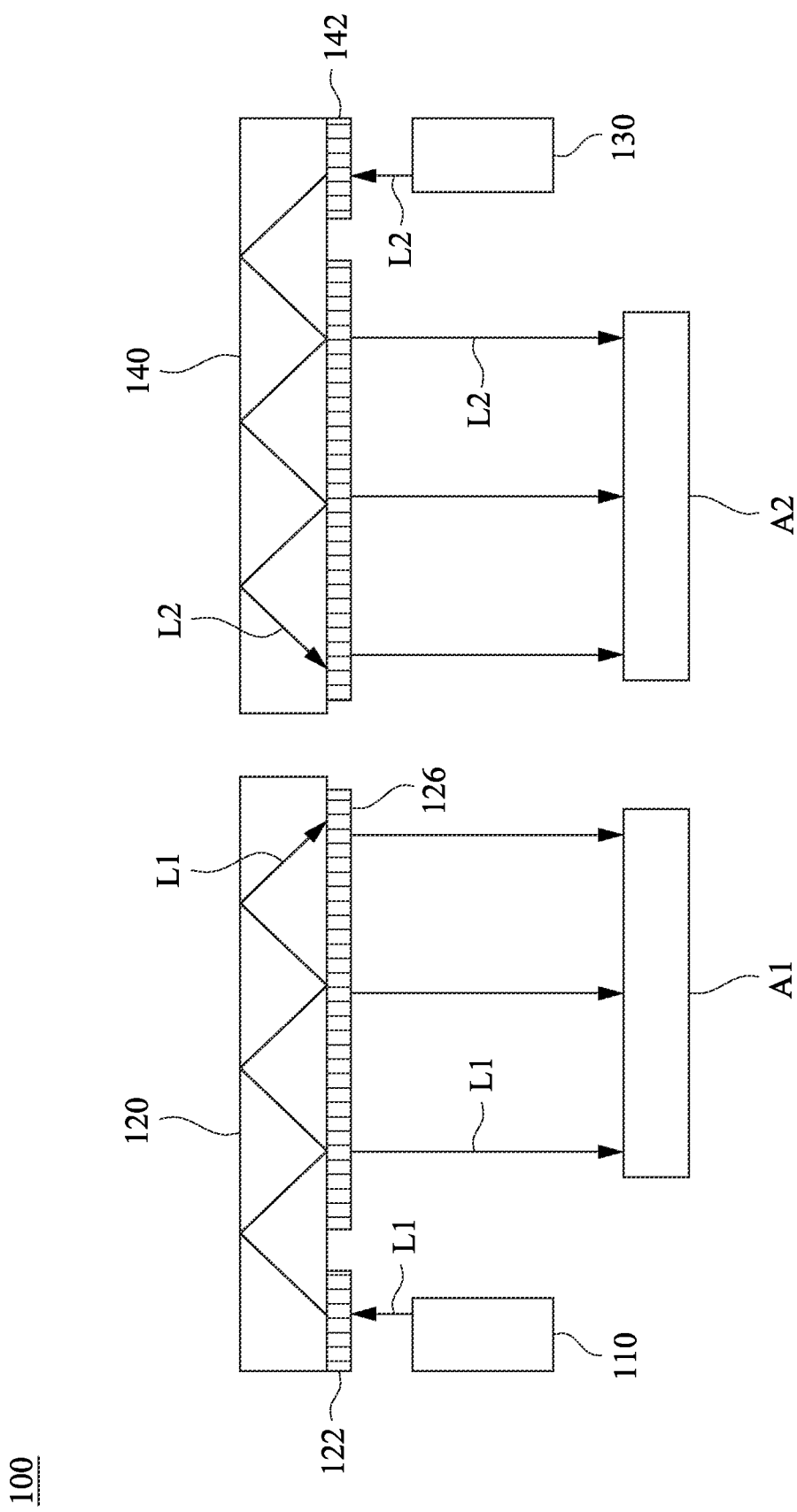
FIG. 2 illustrates a top view of using the display device in FIG. 1, in which second microstructures in FIG. 1 are omitted.

FIG. 2 illustrates a top view of using the display device 100 in FIG. 1, in which the second microstructures 124 and 144 in FIG. 1 are omitted. The first microstructures 122 of the first waveguide glass 120 and the first microstructures 142 of the second waveguide glass 140 may be in-coupling optical elements, so that the first light L1 and the second light L2 are respectively incident to the first waveguide glass 120 and the second waveguide glass 140. The first light L1 and the second light L2 are completely reflected in the first waveguide glass 120 and the second waveguide glass 140. The third microstructure 126 of the first waveguide glass 120 and the third microstructure 146 of the second waveguide glass 140 may be out-coupling optical elements. The third microstructure 126 of the first waveguide glass 120 and the third microstructure 146 of the second waveguide glass 140 may receive the first light L1 and the second light L2, respectively. The third microstructure 126 of the first waveguide glass 120 and the third microstructure 146 of the second waveguide glass 140 may transmit the first light L1 and the second light L2 to the first target area A1 and the second target area A2, respectively. For example, a user's left eye may be located in the first target area A1, and the user's right eye may be located in the second target area A2. After the user's left eye and right eye receive the first light L1 and the second light L2, respectively, the user's brain may combine the images provided by the first light L1 and the second light L2 into a full-color image. That is, the design of transmitting the first light L1 and the second light L2 to the first target area A1 and the second target area A2 may increase a viewing angle of the display device 100 to improve the optical effect of the display device 100.

In the following description, another type of a display device will be described. It is to be noted that the connection relationship of the aforementioned elements will not be repeated.

Figure 3:
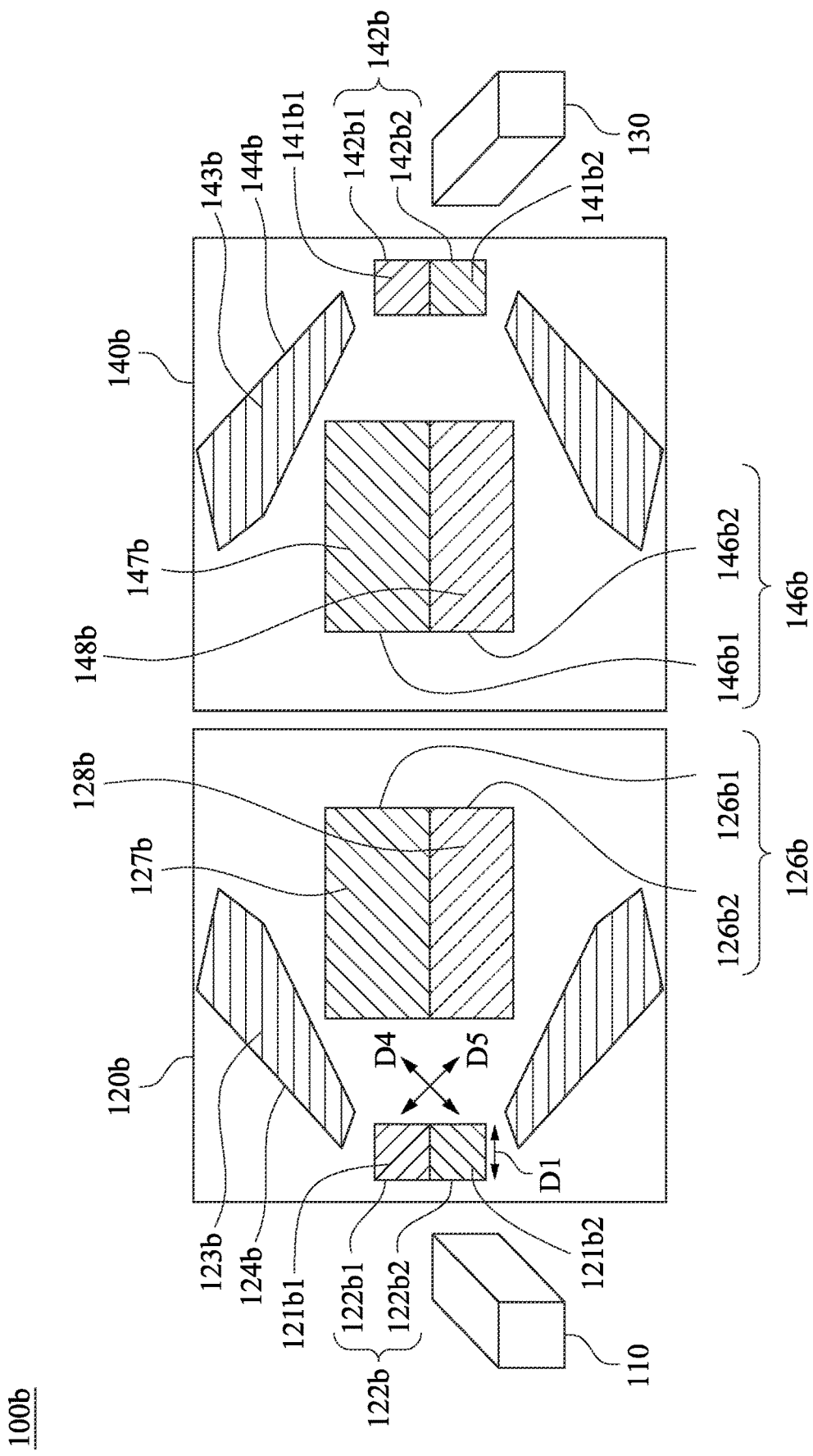
FIG. 3 illustrates a front view of a display device according to another embodiment of the present disclosure.

FIG. 3 illustrates a front view of a display device 100b according to another embodiment of the present disclosure. The difference between the display device 100b of FIG. 3 and the embodiment shown in FIG. 1 is that a first microstructure 122b of a first waveguide glass 120b of the display device 100b has a first portion 122b1 and a second portion 122b2 adjacent to the first portion 122b1. The extending direction D5 of a grating 121b1 of the first portion 122b1 of the first microstructure 122b is different from the extending direction D4 of a grating 121b2 of the second portion 122b2 of the first microstructure 122b. Second microstructures 124b of the first waveguide glass 120b have a grating 123b, and the second microstructures 124b may provide the effect of uniform brightness. A third microstructure 126b of the first waveguide glass 120b has a third portion 126b1 and a fourth portion 126b2 adjacent to the third portion 126b1. A first grating 127b of the third microstructure 126b is located in the third portion 126b1, and a second grating 128b of the third microstructure 126b is located in the fourth portion 126b2.

In some embodiments, a first microstructure 142b of the second waveguide glass 140b of the display device 100b has a first portion 142b1 and a second portion 142b2 to the first portion 142b1. The extending direction D5 of a grating 141b1 of the first portion 142b1 of the first microstructure 142b is different from the extending direction D4 of a grating 141b2 of the second portion 142b2 of the first microstructure 142b. Second microstructures 144b of the second waveguide glass 140b have a grating 143b, and the second microstructures 144b of the second waveguide glass 140b may provide the effect of uniform brightness. A third microstructure 146b of the second waveguide glass 140b has a third portion 146b1 and a fourth portion 146b2 adjacent to the third portion 146b1. A first grating 147b of the third microstructure 146b is located in the third portion 146b1, and a second grating 148b of the third microstructure 146b is located in the fourth portion 146b2.

In the following description, an operating method of a display device will be described.

Figure 4:
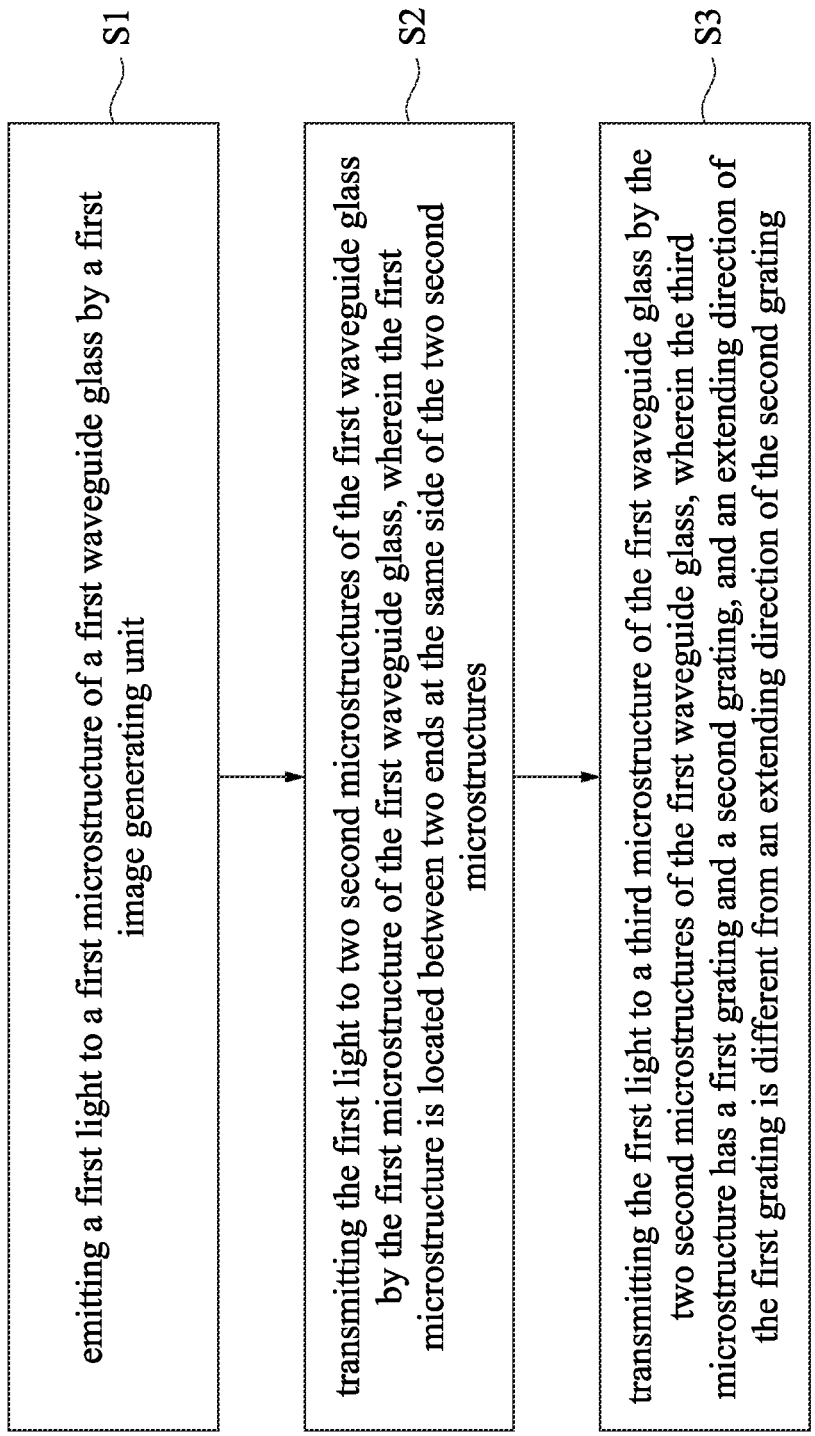
FIG. 4 illustrates a flow chart of an operating method of a display device according to one embodiment of the present disclosure.

FIG. 4 illustrates a flow chart of an operating method of a display device according to one embodiment of the present disclosure. The operating method of the display device includes steps as outlined below. In step S1, a first light is emitted to a first microstructure of a first waveguide glass by a first image generating unit. In step S2, the first light is transmitted to two second microstructures of the first waveguide glass by the first microstructure of the first waveguide glass, wherein the first microstructure is located between two ends at the same side of the two second microstructures. In step S3, the first light is transmitted to a third microstructure of the first waveguide glass by the two second microstructures of the first waveguide glass, wherein the third microstructure has a first grating and a second grating, and an extending direction of the first grating is different from an extending direction of the second grating. In the following description, the aforementioned steps will be described in detail.

Referring to FIG. 1, the first image generating unit 110 may emit the first light L1 to the first microstructure 122 of the first waveguide glass 120. For example, the first light L1 may be full-color. Next, the first light L1 may be transmitted to the two second microstructures 124 of the first waveguide glass 120 by the first microstructures 122 of the first waveguide glass 120. The first microstructures 122 of the first waveguide glass 120 may be located between the two ends E1 at the same side of the two second microstructures 124. For example, the second microstructure 124 of the first waveguide glass 120 may be a folded optical element to receive the first light L1 of the first image generating unit 110 transmitted by the first microstructure 122. The second microstructures 124 may provide the effect of uniform brightness. Then, the first light L1 may be transmitted to the third microstructure 126 of the first waveguide glass 120 by the two second microstructures 124 of the first waveguide glass 120. The third microstructure 126 has the first grating 127 and the second grating 128. The extending direction D4 of the first grating 127 is different from the extending direction D5 of the second grating 128. Conservation of optical momentum may be maintained among the first microstructures 122, the second microstructures 124 and the third microstructures 126 of the first waveguide glass 120, the optical loss of the first light L1 caused by the transmission may be reduced.

Referring to FIG. 2, after the first light L1 is transmitted to the third microstructure 126 of the first waveguide glass 120, the first light L1 may be transmitted to the target area A1 outside the first waveguide glass 120 by the third microstructure 126 of the first waveguide glass 120. Similarly, the second light L2 may be emitted to the second waveguide glass 140 by the second image generating unit 130. The wavelength of the first light L1 is different from the wavelength of the second light L2. For example, the second light L2 may be full-color. It is to be noted that the grating period of the second waveguide glass 140 is different from the grating period of the first waveguide glass 120. Next, the second light L2 may be transmitted to the second target area A2 outside the second waveguide glass 140 by the second waveguide glass 140.

In some embodiments, the third microstructure 126 of the first waveguide glass 120 and the third microstructure 146 of the second waveguide glass 140 may receive the first light L1 and the second light L2, respectively. The light L1 and the second light L2 are transmitted to the first target area A1 and the second target area A2, respectively. For example, the user's left eye may be located in the first target area A1, and the user's right eye may be located in the second target area A2. After the user's left eye and right eye respectively receive the first light L1 and the second light L2, the user's brain may combine the images provided by the first light L1 and the second light L2 into a full-color image. That is, the design of transmitting the first light L1 and the second light L2 to the first target area A1 and the second target area A2 may improve the optical effect of the display device 100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A display device, comprising:
a first image generating unit configured to emit a first light; and
a first waveguide glass facing toward the first image generating unit, and the first waveguide glass comprising:
a first microstructure having a first portion and a second portion adjacent to but not overlapping with the first portion, wherein gratings of the first portion and second portion extend in different directions, and the gratings of the first portion do not intersect the gratings of the second portion;
two second microstructures, wherein the first microstructure is located between two ends at the same side of the two second microstructures; and
a third microstructure located between the two second microstructures and having a third portion and a fourth portion adjacent to but not overlapping with the third portion, wherein gratings of the third portion and fourth portion extend in different directions, and the gratings of the third portion do not intersect the gratings of the fourth portion, and each of the two second microstructures is configured to receive the first light of the first image generating unit transmitted by the first microstructure and transmit the first light to the third microstructure.

2. The display device of claim 1, further comprising:
a second image generating unit configured to emit a second light, wherein a wavelength of the second light is different from a wavelength of the first light; and
a second waveguide glass facing toward the second image generating unit and adjacent to the first waveguide glass.

3. The display device of claim 2, wherein a grating period of the second waveguide glass is different from a grating period of the first waveguide glass.

4. The display device of claim 1, wherein an extending direction of each of the gratings of the first portion and second portion of the first microstructure is different from an extending direction of a grating of one of the two second microstructures.

5. The display device of claim 1, wherein an extending direction of each of the gratings of the third portion of the third microstructure is perpendicular to an extending direction of one of the gratings of the fourth portion of the third microstructure.

6. The display device of claim 1, wherein the first microstructure positionally corresponds to the third microstructure in a horizontal direction.

7. The display device of claim 1, wherein the two second microstructures are symmetrically disposed along a center line between the first microstructure and the third microstructure.

8. An operating method of a display device, comprising:
emitting a first light to a first microstructure of a first waveguide glass by a first image generating unit, wherein the first microstructure having a first portion and a second portion adjacent to but not overlapping with the first portion, wherein gratings of the first portion and second portion extend in different directions, and the gratings of the first portion do not intersect the gratings of the second portion;
transmitting the first light to two second microstructures of the first waveguide glass by the first microstructure of the first waveguide glass, wherein the first microstructure is located between two ends at the same side of the two second microstructures; and
transmitting the first light to a third microstructure of the first waveguide glass by the two second microstructures of the first waveguide glass, wherein the third microstructure is located between the two second microstructures and has a third portion and a fourth portion adjacent to but not overlapping with the third portion, gratings of the third portion and fourth portion extend in different directions, and the gratings of the third portion do not intersect the gratings of the fourth portion.

9. The method of claim 8, further comprising:
transmitting the first light to a first target area outside the first waveguide glass by the third microstructure of the first waveguide glass.

10. The method of claim 8, further comprising:
emitting a second light to a second waveguide glass by a second image generating unit, wherein a wavelength of the first light is different from a wavelength of the second light, and a grating period of the second waveguide glass is different from a grating period of the first waveguide glass; and transmitting the second light to a second target area outside the second waveguide glass by the second waveguide glass.

\* \* \* \* \*